United States Patent
Cruz

(10) Patent No.: US 12,411,170 B2
(45) Date of Patent: Sep. 9, 2025

(54) CONTAINERIZED ORCHESTRATION OF SECURE SOCKET LAYER VIRTUAL PRIVATE NETWORK BENCHMARKING

(71) Applicant: AT&T INTELLECTUAL PROPERTY I, L.P., Atlanta, GA (US)

(72) Inventor: Elmer Cruz, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 80 days.

(21) Appl. No.: 17/876,479

(22) Filed: Jul. 28, 2022

(65) Prior Publication Data

US 2024/0036112 A1   Feb. 1, 2024

(51) Int. Cl.
| | |
|---|---|
| G01R 31/317 | (2006.01) |
| G01R 31/3183 | (2006.01) |
| G06F 21/57 | (2013.01) |
| H04L 43/50 | (2022.01) |

(52) U.S. Cl.
CPC .  *G01R 31/31719* (2013.01); *G01R 31/31713* (2013.01); *G01R 31/318314* (2013.01); *G06F 21/577* (2013.01); *H04L 43/50* (2013.01)

(58) Field of Classification Search
CPC ........ G01R 31/31719; G01R 31/31713; G01R 31/318314; G06F 21/577; H04L 43/50; H04L 41/16; H04L 43/20
See application file for complete search history.

(56) References Cited

U.S. PATENT DOCUMENTS

| | | | | |
|---|---|---|---|---|
| 11,089,076 | B1 * | 8/2021 | Thario | H04L 65/612 |
| 11,307,967 | B2 * | 4/2022 | Zhang | G06F 11/3688 |
| 11,310,165 | B1 * | 4/2022 | Arguelles | G06Q 20/08 |
| 11,803,456 | B2 * | 10/2023 | Chandhoke | G06F 11/273 |

(Continued)

FOREIGN PATENT DOCUMENTS

WO   WO-2022034482 A2 *   2/2022   .......... G06F 11/3664

OTHER PUBLICATIONS

A. Osman, S. Hanisch and T. Strufe, "SeCoNetBench: A modular framework for Secure Container Networking Benchmarks," 2019 IEEE European Symposium on Security and Privacy Workshops (EuroS&PW), Stockholm, Sweden, 2019, pp. 21-28, doi: 10.1109/EuroSPW.2019.00009. (Year: 2019).*

(Continued)

*Primary Examiner* — Rachel J Hackenberg

(57) ABSTRACT

Containerized orchestration of secure socket layer virtual private network benchmarking is disclosed. A test portal can accommodate developing test event information (TEI) based on test input information. Test input information can be used to generate event images, e.g., containers, that can be readily scaled, mutated, etc., via a containerization environment instance. One or more event image can be groups into a pod. An event image can be a new container, a previously used container, or a permutation of a container. Event image(s) can be retrieved from external sources, e.g., a library, a commercial vendor of event images, etc. TEI can be based on a pod(s) and communicated to a device-under-test (DUT). DUT performance can be measured, and results can be accessed by an entity, e.g., a test engineer, a results analysis engine, etc. Results can be employed to direct subsequent DUT testing.

20 Claims, 10 Drawing Sheets

(56) References Cited

U.S. PATENT DOCUMENTS

| | | | |
|---|---|---|---|
| 11,829,280 B1* | 11/2023 | Zhang | G06F 11/3684 |
| 2019/0278681 A1* | 9/2019 | Grinkemeyer | G06F 21/44 |
| 2019/0370162 A1* | 12/2019 | Mandal | G06F 11/3692 |
| 2022/0158912 A1* | 5/2022 | Ikaheimo | H04L 41/0816 |
| 2022/0237111 A1* | 7/2022 | Stavros | G06F 11/301 |

OTHER PUBLICATIONS

Ziqiang Wang "Design and Implementation of a Reliable Container-based Service Function Chaining Testbed in Cloud-native System: An Open Source Approach", sections 4 & 5, pp. 60-95, year 2022 (Year: 2022).*

* cited by examiner

CONTAINERIZED ORCHESTRATION OF SECURE SOCKET LAYER VIRTUAL PRIVATE NETWORK BENCHMARKING

TECHNICAL FIELD

The disclosed subject matter relates to secure socket layer (SSL) virtual private network (VPN) benchmarking, and more specifically to employing containerized orchestration technology to improve automation of SSL VPN benchmarking enabling more robust benchmarking of devices under test (DUTs).

BACKGROUND

The cybersecurity industry has begun adopting the concept of zero-trust for modern networked devices and zero trust implementations will likely continue to be in use well into the future. An implementation of the zero-trust concept is employing secure sockets layer (SSL) virtual private network (VPN) for establishing an encrypted link between a server and a client. Accordingly, cybersecurity vendors are creating various implementations of SSL VPN. However, conventional testing of these various implementations of SSL VPN is generally time consuming and expensive. Moreover, a company attempting to implement SSL VPN enabled systems typically reply on each cybersecurity vendor's purported capabilities, typically because self-testing of different cybersecurity vendor solutions is so costly and time consuming. There is currently little to no affordable and efficient way for a company to verify and/or compare cybersecurity vendor SSL VPN solutions via self-testing of these different cybersecurity vendors solutions. This can result in a company implementing a solution based on the cybersecurity vendor's purported performance and can result in expending significant corporate resources into an implementation that may not actually attain the purported performance in a deployed system. A self-service benchmarking tool would be of high value to companies seeking to select, implement, etc., a cybersecurity vendor SSL VPN from among one or more cybersecurity vendors.

DETAILED DESCRIPTION

Figure 1:
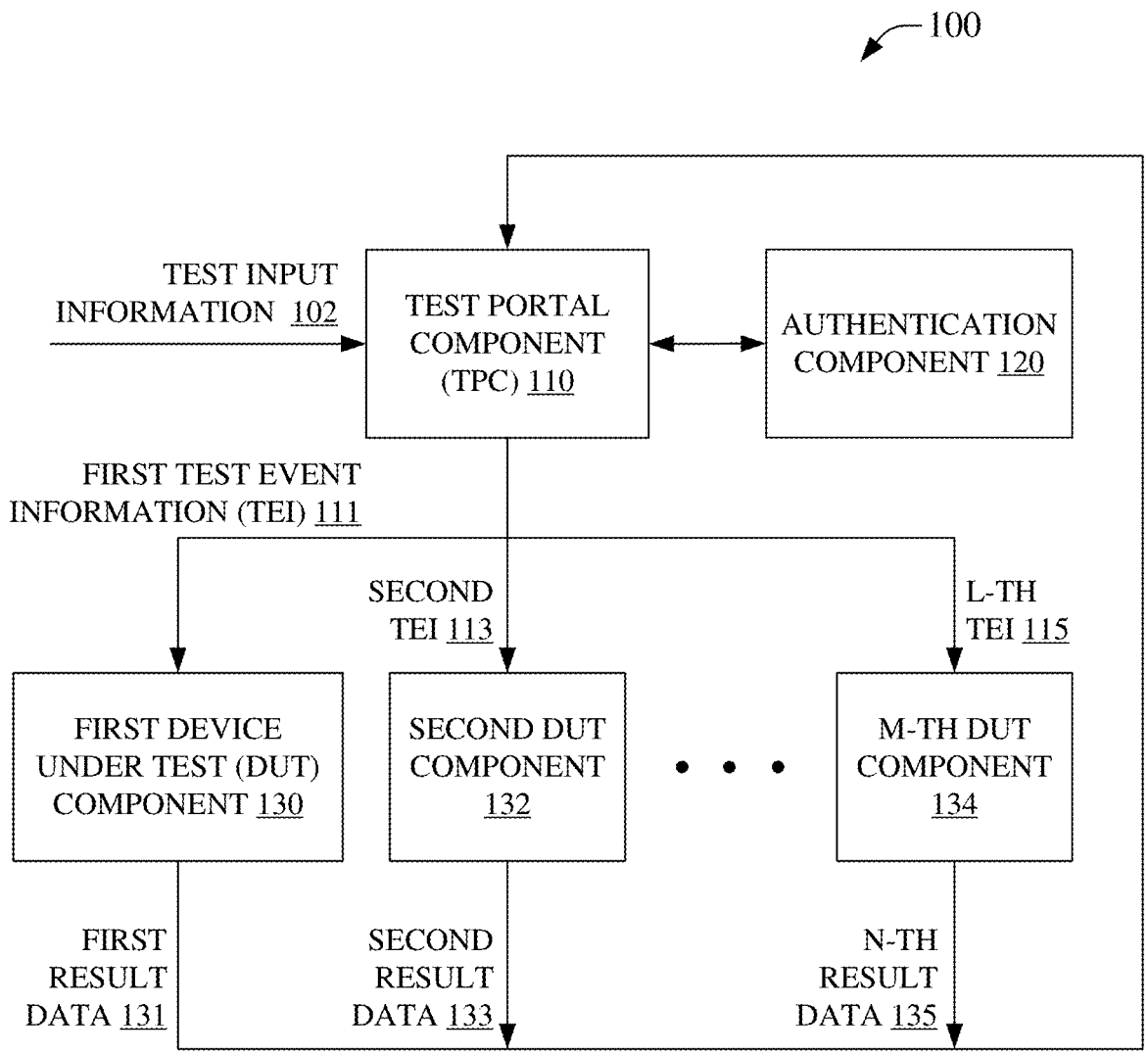
FIG. 1 is an illustration of an example system that can facilitate testing of a SSL VPN enabled device, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Generally, secure sockets layer (SSL) virtual private network (VPN) protocol(s) are not a standardized and different security product vendors can apply their own proprietary version of SSL VPN. A vendor offering a SSL VPN product will then typically provide a customer with a vendor's own performance data that the customer must then rely on. In this regard, a customer usually does not have a flexible, cost-effective, and low effort way to perform their own benchmarking to compare against vendor provided performance data. A customer usually just has to take for granted the vendor performance data, which can be high risk where customer products can then be dependent upon the accuracy of the vendor-provided performance data. Where the vendor-data may be incorrect, invested resources and money can be jeopardized. Currently, because there isn't a single environment that provides benchmark testing of different types of SSL VPNs, e.g., SSL VPNs from different vendors, different SSL VPNs from a same vendor, or combinations thereof, tests are individually developed, e.g., as a pilot test, for each different SSL VPN appliance being considered by a customer. A pilot test typically employs only a few network tunnels to a VPN concentrator. This allows a small sample test to be performed, which is then multiplied to provide a 'rough guess' on expected performance of the SSL VPN appliance being tested, hereinafter generally referred to as a device-under-test (DUT). As noted, typically pilot tests are individually developed for each different DUT, at great expense in money, effort, time, resources, etc.

The subject matter disclosed herein proposes accommodation of multiple DUT tests, e.g., an environment that supports SSL VPN benchmarking of different DUTs from one or more security product vendors. The disclosed subject matter can support selectable test criteria, scalable testing that can be more expansive than pilot testing, testing across one or more physical and/or virtual SSL VPN devices, enable easier/rapid permutation of testing and/or retesting, etc. It is expected that the disclosure can reduce the workload needed to instigate a benchmarking test of a DUT, and typically reduce the cost of performing said testing. In contrast to conventional testing service costs that can easily exceed $100,000 for just a six-session test performed on just one version of a SSL VPN device, the disclosed subject matter can perform multiple tests with many more sessions via scaling of test event containers and, moreover, can perform benchmarking on many different DUTs. Furthermore, in some embodiments, the testing events of different DUTs can be selected to be comparable, enabling comparison of the performances of the different DUTs.

In embodiments of the disclosed subject matter, a containerized application/workload/service can be leveraged to containerize testing of a DUT. A containerized application/workload/service can be an application/workload/service that can run in an isolated runtime environment called a container, container instance, etc., typically referred to hereinafter as an 'event image(s)'. A container instance (event image) can encapsulate an application/workload/service with all needed dependencies, including system libraries, binaries, configuration files, consumable data, etc. One or more event images can be comprised in a container group, referred to hereinafter as a 'pod', e.g., a pod can comprise one or more event images. Containerization can be cloud based and/or premise based, e.g., can be a virtual containerization component, a physical containerization component, or any combination thereof. Whereas containerization can be used in various computing tasks, a general containerization environment can, for example, support containerization related to the disclosed subject matter alone or contemporaneously with other unrelated or related containerization activities, wherein containerization related to the disclosed subject matter can be regarded as one or more instance(s) of a dedicated containerization component(s) specifically adapted to the benchmark testing of one or more SSL VPN device(s). As an example, a KUBERNETES cluster can support a first containerization instance for a car maker that is unrelated to a second consumerization instance for a network provider specifically adapted for testing SSL VPNs, as disclosed herein, without departing from the scope if the instant application. The general applicability of containerization to both the example first containerization instance and second containerization instance demonstrates that while a containerization environment can be regarded as general purpose, each containerization instance should be regarded as specific purpose and not general purpose.

In embodiments, a containerization instance can provision one or more pod(s), e.g., one or more groups of container instance(s), e.g., a pod can be provisioned with any number of event images. As stated, an event image can be an application, workload, service, data, etc., or combinations thereof. As examples, an event image can act as a SSL agent, emulate a user accessing and engaging with a social media service, emulate a user navigating a webpage, emulate malware/virus traffic, simulate data for VoIP services, or emulate, simulate, etc., any data, traffic, executable, parameter, etc., for nearly any type of communication expected to travers a SSL VPN encrypted link between a sever and a client, e.g., information flow across a vendor's SSL VPN appliance being treated as a DUT. Accordingly, a pod can be applied to a DUT to evaluate the performance of the DUT. Moreover, the event images of one or more pod(s) can be scaled via a containerization instance to enable testing of any nearly any number of interactions with a DUT. This can be in sharp contrast to conventional pilot testing technology. As an example, SSL agent event image and a HTTP payload container event image can be comprised in a pod to establish a very generic SSL VPN tunnel to a DUT. Other services, such as TCP and UDP payload event images, etc., can also be added to one or more pods. Each pod can then attempt to establish a separate tunnel to a DUT and performance of the DUT can be evaluated. Rather than just a few tunnels typical of a conventional pilot test, massive numbers of pods can be replicated in the containerization instance, each applying pressure to the DUT via a separate tunnel with separately selectable event images. In an example, hundreds or even thousands of pods can be applied to testing a DUT, having corresponding hundreds or thousands of SSL VPN tunnels passing traffic via the DUT, to enable much more realistic benchmarking of the DUT that would ever be possible with a conventional pilot test, and with far less effort/resources, money, etc., than would be committed for conventional individualized test platforms. Containerization instance application programming interfaces (APIs) generally support pod replication and, where one pod can equate to one SSL VPN tunnel to a DUT, replication of, and permutation of, pods can permit efficient and low-cost truly massive testing of one or more DUT. As an example, in a KUBERNETES cluster, the 'ReplicaSet' function can enable maintaining a stable set of replica pods running at any given time. Generally, ReplicaSet, or other analogous functions in other containerization environments such as REDHAT OPENSHIFT, etc., can be used to guarantee the availability of number of identical pods, and applying these types of functions to SSL VPN testing can support increasing a count of SSL VPN tunnels to one or more DUTs. In embodiments, a reference pod can be mutated into several child pods to which ReplicaSet-type functions can be applied to enable massive testing with varied pods, for example, one group of pods can be tailored to a proprietary SSL VPN API for a first vendor's DUT, that can be different form a second group of pods comprising a different variant of the SSL VPN tailored to a second vendor's DUT. Moreover, one or more different pod(s) can be directed at each DUT, e.g., all DUTs can face a first consistent group of pods and each of those DUTs can individually also face additional pods tailored specifically to each DUT. Numerous other pod and event image manipulations will be readily appreciated by one of skill in the art and all of these are to be considered within the scope of the instant subject matter, even where not explicitly recited for the sake of clarity and brevity.

In embodiments, considering that most DUTs will be API enabled and accessible, the disclosed subject matter can support accessing the DUT via the DUT's API. This can provide more directly querying and observing DUT performance, e.g., by a reporting component as disclosed elsewhere herein. This access to the DUT API can improve visibility into the DUT, and therefore can provide more seamless benchmarking report capability, e.g., the disclosed example systems can use the DUT API commands to 'talk' to the DUT and retrieve performance metric value(s). The performance metric value(s) can then be updated in near real time. In an aspect, this can also provide improved control over the benchmark testing. As an example, where a DUT is being overwhelmed by a test, the ReplicaSet-type function can be used to decrease a count of pods being applied to reduce the load on the DUT in near real time. As another example, where a DUT is easily managing a test, the ReplicaSet-type function can be used to increase a count of pods, the selected mix of event images can be adapted, etc., on the fly, to increase/change the load on the DUT, also in near real time. This can be in improvement over running a test, then logging into a DUT to review the results or monitor performance of the DUT during testing which can result in a tester needing to switch back and forth between the DUT and the presently disclosed testing system(s). In some embodiments, the ability to employ containerization instances in a containerization environment, which can often be very expansive and can provision a containerization instance nearly anywhere in the world, can facilitate deployment of the presently disclosed subject matter on nearly any scale and in nearly any location. In some embodiments, this can enable a testing provider to provide the disclosed testing services, e.g., via web portal, etc., to other entities, e.g., a smaller entity can rent time on the disclosed testing platform from a larger entity that can be better positioned to implement the testing platform as a service.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate testing of a SSL VPN enabled device, in accordance with aspects of the subject disclosure. System 100 can comprise test portal component (TPC) 110 that can receive test input information 102. Test input information 102 can be generated, for example, by a test engineer and/or other user, by an automated test information generating system, such as a fuzz testing system, artificial intelligence, machine learning system, etc., and/or can be generated by other entities/systems. TPC 110 can include a testing information input interface (UX) that can, in some embodiments include a graphical, test, or other input mechanism, to facilitate input of test input information 102. As an example, TPC 110 can support a web page interface that can enable graphical and/or text entry of test input information 102.

TPC 110 can be connected to authentication component 120 to facilitate authentication of test input information 102 to TPC 110. As an example, a test engineer can be authenticated to TPC 110 via authentication component 120 prior to accepting test input information 102 as valid/permitted input to TPC 110. As another example, test input information 102 generated by an external test input generating system, which test input generating system can be validated via authentication component 120 prior to TPC 110 permitting test input information 102 received from the example external test input generating system to be employed for testing of a DUT. In various embodiments, a DUT can be a physical firewall, virtual firewall, physical server, server deployed in a virtual environment, or other device or virtual instance supporting establishment of a SSL VPN communication link, e.g., between a client and a server, etc.

TPC 110 can enable generation of test event information (TEI) used to test DUTs, e.g., first TEI 111, second TEI 113, L-th TEI 115, etc., can be employed in testing first DUT component 130, second DUT component 132, M-th DUT component 134, etc. TEI can be based on test input information 102. In some embodiments, test input information 102 can have a 1:1 correspondence to TEIs, DUTs, or combinations thereof. In an example, test input information 102 can comprise testing information for two types of DUTs, which can then result in first TEI 111 and second TEI 113 that can be used to test first DUT component 130 and second DUT component 132 correspondingly. As another example, test input information 102 can comprise testing information for two types of DUTs, which can then result in only first TEI 111 that can be used to test both first DUT component 130 and second DUT component 132 correspondingly, e.g., the same TEI can be used to test two different DUTs. As a further example, test input information 102 can comprise testing information for two types of DUTs, which can then result in first TEI 111 that can be used to test first DUT component 130, and second TEI 113 that can be used to test second DUT component 132 and a third DUT component (not illustrated). In an additional example, test input information 102 can comprise testing information for one type of DUT, which can then result in first TEI 111 and second TEI 113 that can be used to test first DUT component 130. In some embodiments, test input information 102 can have a 1:many correspondence to TEIs, DUTs, or combinations thereof. As examples, test input information 102 can comprise testing information for one type of DUT can result in first TEI 111, second TEI 113, . . . , L-th TEI 115, etc., that can be used to test one or more DUTs, e.g., first DUT component 130, second DUT component 132, . . . , M-th DUT component 134, etc., in nearly any combination of TEI to DUT. In this regard, test input information 102 can be mutated by TPC 110 to result in one or more TEIs, and these one or more TEIs can be used to test one or more DUTs, one or more types of DUTs, etc.

Testing of DUTs can result in result data, e.g., first result data 131, second result data 133, . . . , N-th result data 135, etc. It becomes apparent that the result data can be generated more quickly and more affordably via TPC 110 than in comparison to conventional DUT testing schemes that typically are custom designed by test engineers to test specific DUTs in a one-off manner, e.g., pilot testing, hardware implemented to test a specific DUT, etc. These valuable improvements over conventional SSL VPN device testing can be enabled by basing TEIs on scalable containerized test events, as is disclosed in more detail hereinbelow. Result data can be communicated back to TPC 110 to facilitate further testing, modification of testing on the fly, presentation of results, etc. In some embodiments, result data may not be communicated back to TPC 110, in which embodiments, result data can be accessed in myriad other manners, for example a test engineer can log into and directly access result data from the DUTs.

Figure 2:
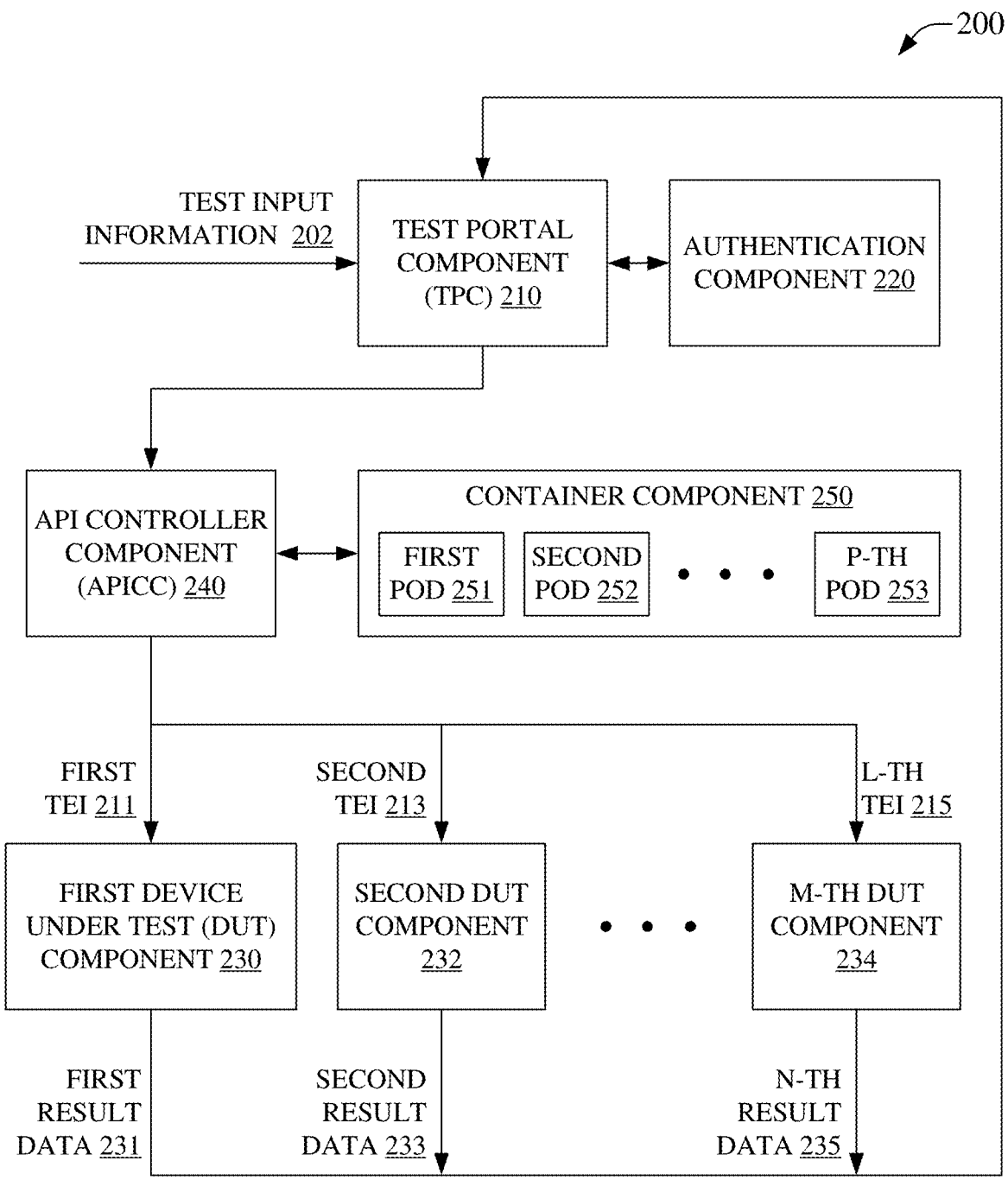
FIG. 2 is an illustration of an example system that can facilitate interrogation of a SSL VPN enabled device based on scalable containerized test events, in accordance with aspects of the subject disclosure.

FIG. 2 is an illustration of a system 200, which can enable interrogation of a SSL VPN enabled device based on scalable containerized test events, in accordance with aspects of the subject disclosure. System 200 can comprise TPC 210 that can receive test input information 202. TPC 210 can be connected to authentication component 220 to facilitate authentication of test input information 202 received by TPC 210. As an example, a test engineer can be authenticated to TPC 210 via authentication component 220 prior to accepting test input information 202 as valid/permitted input to TPC 210.

TPC 110 can be communicatively coupled to API controller component (APICC) 240. APICC 240 can facilitate generation of TEI used to test DUTs, e.g., first TEI 211, second TEI 213, L-th TEI 215, etc., that can be employed in testing first DUT component 230, second DUT component 232, M-th DUT component 234, etc. TEI can be based on test input information 202 received by TPC 210. APICC 240 can facilitate generation of groups of event images as pods of one or more containerization instances, e.g., first pod 250, second pod 252, . . . , P-th pod 253, etc., supported by container component 250 that can comprise one or more containerization instances. As an example, a first KUBERNETES instance can comprise first pod 251 to P-th pod 253. As another example, a first KUBERNETES instance can comprise first pod 251 and a second KUBERNETES instance can comprise second pod 252, etc. As a further example, a first KUBERNETES instance can comprise first pod 251 and a first REDHAT OPENSHIFT instance can comprise second pod 252 to P-th pod 253, etc.

APICC 240 can employ one or more pods in the generation of one or more TEIs reflecting test input information 202 received by TPC 210. As an example, first pod 251 can be used to generate first TEI 111 via APICC 240, second pod 252 correspondingly can be used to generate second TEI 213, etc. In another example, first pod 251 can be used to generate first TEI 111, second TEI 213, etc., via APICC 240. In a further example, first pod 251, second pod 252, etc., can be used to generate first TEI 111 via APICC 240.

Testing of DUTs, e.g., first DUT component 230, second DUT component 232, . . . , M-th DUT component 234, etc., according to the generated TEIs, e.g., first TEI 211, second TEI 213, . . . , L-th TEI 215, etc., can produce result data, e.g., first result data 231, second result data 233, . . . , N-th result data 235, etc. Result data can be communicated back to TPC 210 to facilitate subsequent testing, adaptation of ongoing testing, presentation of results, etc. In some embodiments, result data may not be communicated back to TPC 210, in which embodiments, result data can be accessed in myriad other manners, for example result data from one or more DUTs can be communicated directly to a test engineer, etc.

Figure 3:
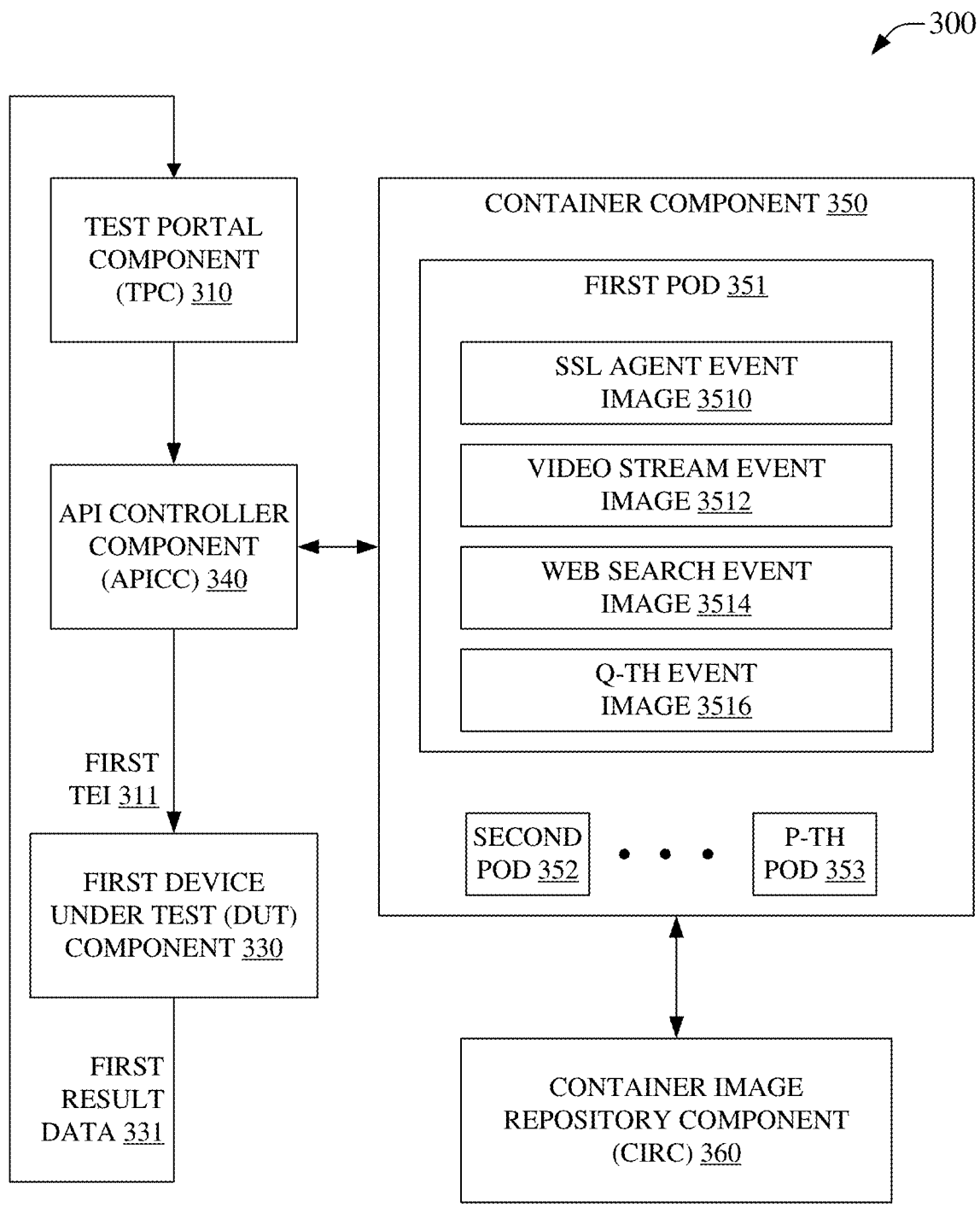
FIG. 3 is an illustration of an example system that can enable provisioning containerized a test event populated with an event image that can be selected from a repository of event images to support testing of a SSL VPN enabled device, in accordance with aspects of the subject disclosure.

FIG. 3 is an illustration of a system 300, which can facilitate provisioning containerized a test event populated with an event image that can be selected from a repository of event images to support testing of a SSL VPN enabled device, in accordance with aspects of the subject disclosure. System 300 can comprise TPC 310 that can receive test input information. TPC 310 can be connected to an authentication component to facilitate determining a permission to use received of test input information, e.g., a test engineer can be authenticated to TPC 310 via the authentication component prior to permitting use of any received test input information.

TPC 110 can be communicatively coupled to APICC 340, which can facilitate generation of TEI used to test DUTs, e.g., first TEI 311, etc., which can be employed in testing first DUT component 330, etc. TEI can be based on test input information received by TPC 310. APICC 340 can facilitate generation of groups of event images, e.g., first pod 351, second pod 352, . . . , P-th pod 353, etc., supported by container component 350. Pods, e.g., first pod 351, etc., can comprise one or more event images, for example, SSL agent event image 3510, video stream event image 3512, web search event image 3514, Q-th event image 3516, etc. An event image can be a container instance that can encapsulate an application, workload, service, etc., with all needed dependencies, including system libraries, binaries, configuration files, consumable data, etc. As such, a pod can be deployed that can comprise a mix of nearly any number and combination of event images. As illustrated in example system 300, first pod 351 can comprise an emulation of one or more SSL agents, an emulation of one or more video streaming events, an emulation of one or more web search events, etc. In embodiments, event images can emulate viruses, worms, denial of service attacks, or other malware.

Other pods can be direct replicas of another pod, can be permutations of another pod, or can be pods comprising distinct other groups of event images. In this regard, containerization instances can employ traditional pod replication functionality to multiply demands on one or more DUTs, typically at less cost and higher speed than conventional one-off buildouts of test platforms. Moreover, containerization can be cloud based and/or premise based, e.g., can be a virtual containerization component, a physical containerization component, or any combination thereof, which can facilitate scalable deployment of DUT benchmarking that can be performed from nearly any location. As an example, first pod 351 can be used in the U.S. to test a firewall product located in Virginia, while first pod 351 can be replicated in France into another containerization instance to test a server located in Paris where, in this example, it can be desirable to avoid trans-Atlantic network issues at the time of testing, however, it is noted that the example U.S.—based first pod 351 could easily be used to test the server in Paris where there is no concern with using the example trans-Atlantic network or where it is instead actually desirable to include the trans-Atlantic network in the testing of the example Paris DUT.

Container component 350 can access one or more stored event images via container image repository component (CIRC) 360. In an embodiment, CIRC 360 can act as a library of stored event images, for example, previously developed event images, e.g., new event images developed independent of a current DUT benchmarking design phase, event images that have been used historically to test a type of DUT, e.g., reusing event images, etc. In some embodiments, CIRC 360 can enable access to event images not stored by CIRC 360, for example in external event image libraries, by accessing commercially available event images, e.g., event images designed by another entity and made available for use, such as for a fee, for access to testing results, etc., or other external event image resources. In a further embodiment, CIRC 360 can also generate event images. As an example, CIRC 360 can mutate a first event image to generate a second event image based on, but different from, the first event image. In another example, CIRC 360 can generate new event images, e.g., sua sponte. This can be enabled by analysis of testing needs, analysis of other event image usage, via artificial intelligence and/or machine learning determinations of desirable event images, etc. Accordingly, for example, container component 350 can generate pods that can comprise one or more pods that comprise one or more groups of one or more event images, wherein the event images can be previously used, newly generated, purchased from outside developers, etc., via CIRC 360. In this example, the pod(s) can then be employed in benchmark testing of one or more DUTs via APICC 340, e.g., first TEI 311 can comprise a pod(s) to test first DUT component 330, etc.

Testing of a DUT(s) can generate result data, e.g., first result data 331, etc. Result data can be communicated back to TPC 310 to facilitate subsequent testing, adaptation of ongoing testing, presentation of results, etc. As an example, based on near-real-time (NRT) first result data 331, TPC 310, via APICC 340, can indicate that first TEI 311 be modified, which can result, for example, in an additional pod being created from event images accessed via CIRC 360, wherein first TEI 311 can be modified by APICC 340 to then cause further testing of first DUT component 330 based on the newly added pod, causing new NRT result data to be passed to TPC 310 that reflects the example modification. In some embodiments, result data may not be communicated back to TPC 310, in which embodiments, result data can be accessed in nearly any other manner, for example result data from one or more DUTs can be communicated to a result repository that can, for example, be accessed by an interested test engineer, etc.

Figure 4:
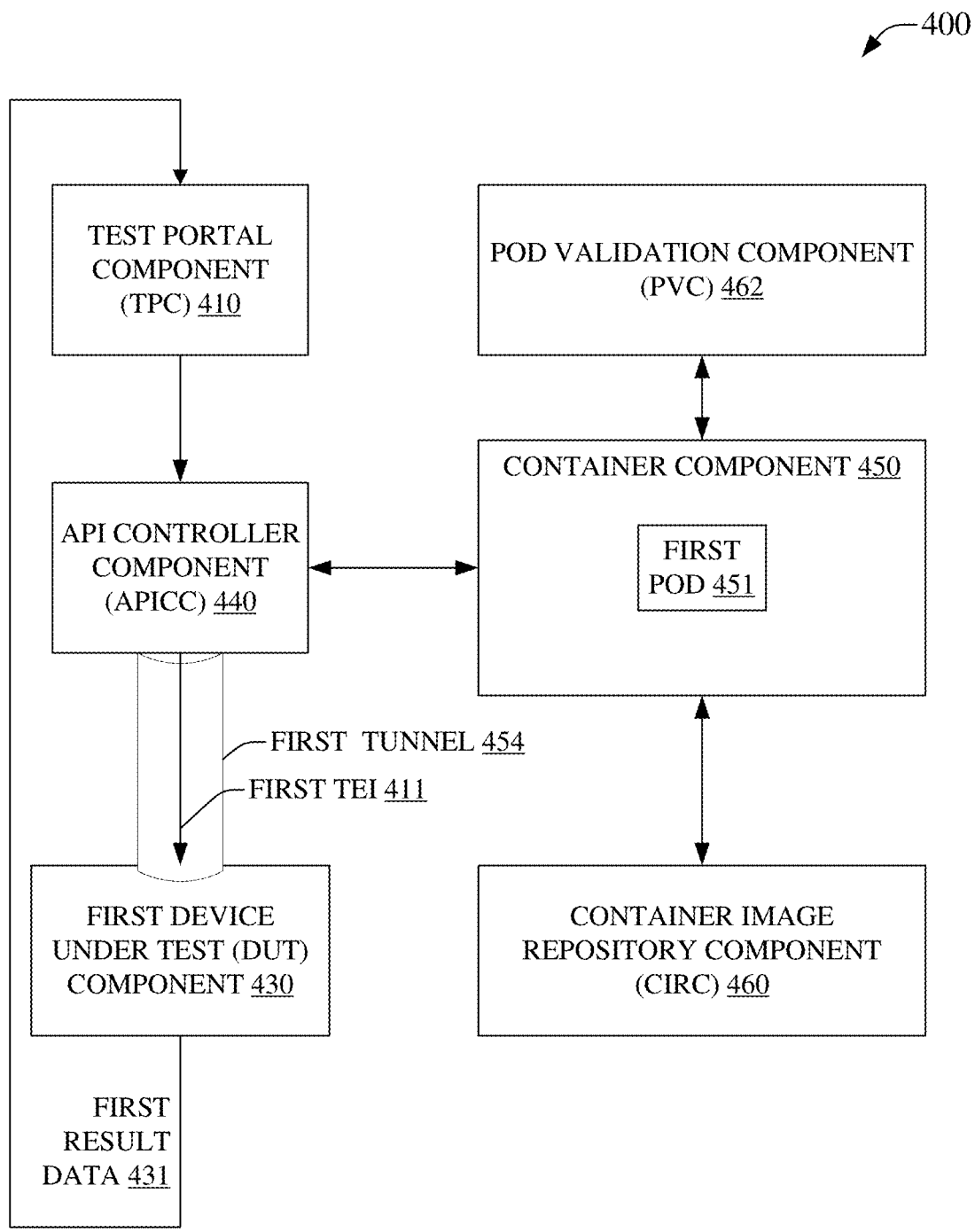
FIG. 4 illustrates an example system that can facilitate validating a test event container employed in testing of a SSL VPN enabled device, in accordance with aspects of the subject disclosure.

FIG. 4 is an illustration of a system 400, which can enable validating a test event container employed in testing of a SSL VPN enabled device in accordance with aspects of the subject disclosure. System 400 can comprise TPC 410 that can receive test input information. TPC 410 can be connected to an authentication component to facilitate determining a permission to use received test input information. TPC 110 can be communicatively coupled to APICC 440, which can facilitate generation of TEI used to test DUTs, e.g., first TEI 411, etc., which can be employed in testing first DUT component 430, etc. TEI can be based on test input information received by TPC 410. APICC 440 can facilitate generation of groups of event images, e.g., first pod 450, etc., supported by container component 450. Pods, e.g., first pod 451, etc., can comprise one or more event images. An event image can be a container instance that can encapsulate an application, workload, service, etc., with all needed dependencies, including system libraries, binaries, configuration files, consumable data, etc. As such, a pod can be deployed that can comprise a mix of nearly any number of, and any combination of, event images. As illustrated in example system 300, first pod 351 can comprise an emulation of one or more SSL agents, an emulation of one or more video streaming events, an emulation of one or more web search events, etc.

Other pods can be direct replicas of another pod, can be permutations of another pod, or can be pods comprising distinct other groups of event images. In this regard, containerization instances can employ traditional pod replication functionality to multiply demands on one or more DUTs, typically at less cost and higher speed than conventional one-off buildouts of test platforms. Moreover, containerization can be cloud based and/or premise based, e.g., can be a virtual containerization component, a physical containerization component, or any combination thereof, which can facilitate scalable deployment of DUT benchmarking that can be performed from nearly any location. Whereas a pod can include one or more event image, and whereas an event image can be mutation of another event image or a newly developed event image, it can be desirable to validate the pod as being sufficiently correlated to test input information and functional.

In this regard, an event image that is determined to not be sufficiently correlated to test input information, resulting in the pod comprising the event image to fail validation, can be cured prior to use. Similarly, nonfunctional event images, and their defective pods, can also be cured. Curing a pod, e.g., curing an event image of a pod, prior to use in a TEI can avoid unnecessary testing of the DUT, improper testing of the DUT, errant testing of the DUT, etc. As an example, a mutated event image can be determined to sufficiently deviate from a base event image to the extent that testing of the DUT with a pod comprising that mutated event would not be appropriate, such as the mutation causing the event image to be nonfunctional, include parameters that are outside of the desired benchmarking, contains no data or too little data, contains too much data or is otherwise oversized, etc. Validation of one or more pods can be performed via pod validation component (PVC) 462. In embodiments, some event images of a validated pod can be stored as valid event images via CIRC 460. Validation, via PVC 462, can for example, be performed by a human actor, by a machine, etc. As an example, a machine can emulate a known DUT(s) and can perfume validation checks of a pod against the emulated known DUT(s) to determine if the pod is causing the desired testing indicated via test input information received by TPC 410. Curing a pod, e.g., by curing the event images comprised in the pod, can be performed, for example, by a human actor, by APICC 440, by container component 450, etc. Curing can comprise simply discarding a pod and provisioning a new pod, discarding an event image(s) of a pod, in which case the pod can be modified to cure the defective event image(s) and revalidated by PVC 462, or nearly any other curative action/event.

In an embodiment, attempting to provisioning a tunnel(s) for testing a DUT can be predicated on a pod being validated by PVC 462. As an example, first pod 451 can be validated by PVC 462, which validation can be regarded as permitting APICC 440 to initiate first tunnel 454, through which first TEI 411 can be used to test first DUT component 430. Testing of a DUT(s) can generate result data, e.g., first result data 431, etc. Result data can be communicated back to TPC 410 to facilitate subsequent testing, adaptation of ongoing testing, presentation of results, etc. In some embodiments, result data may not be communicated back to TPC 410, in which embodiments, result data can be accessed in other appropriate ways.

Figure 5:
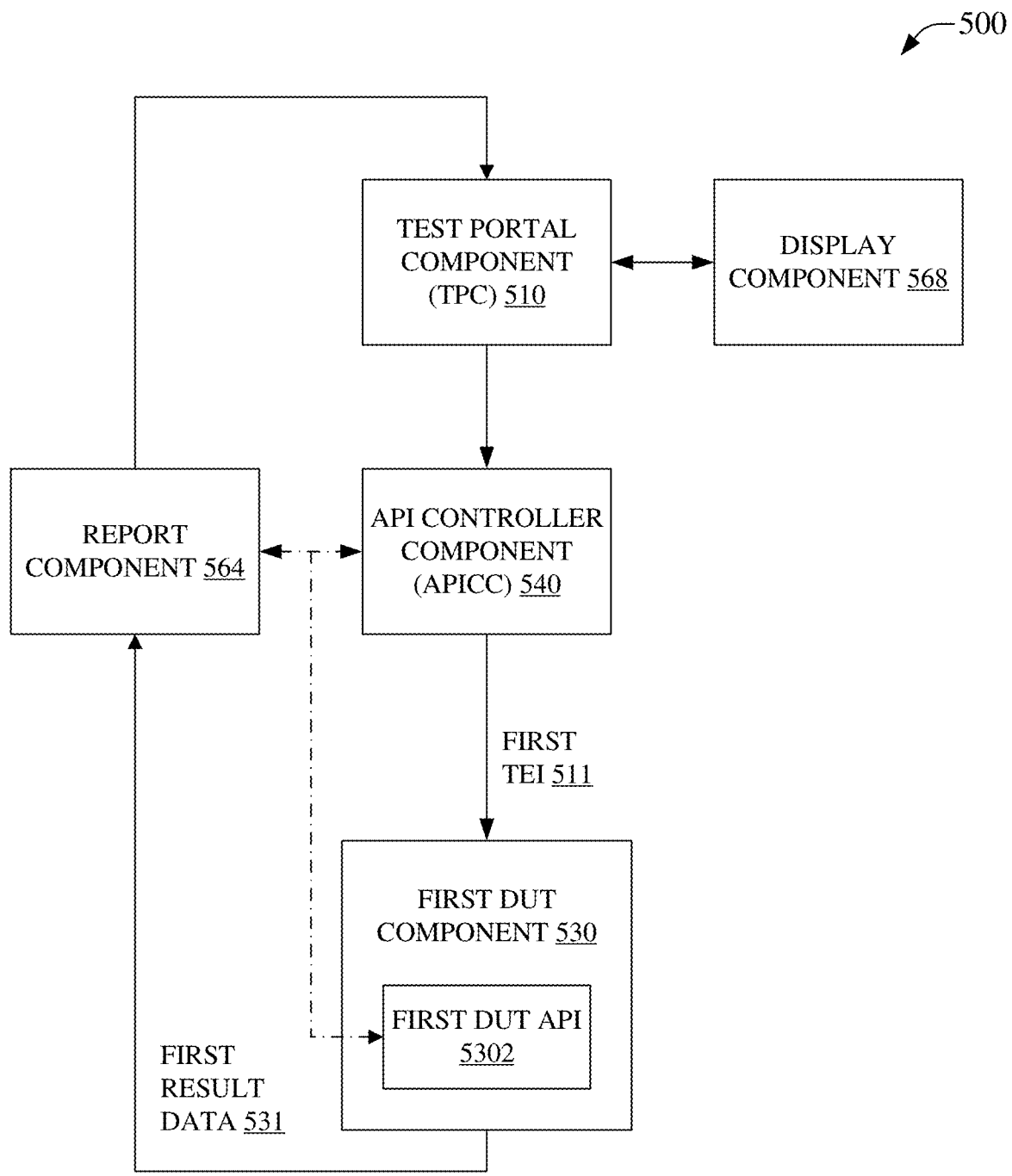
FIG. 5 illustrates an example system that can facilitate compiling and rendering of result data resulting from testing of a SSL VPN enabled device, in accordance with aspects of the subject disclosure.

FIG. 5 is an illustration of a system 500, which can support compiling of, and in some embodiments rendering of, result data resulting from testing of a SSL VPN enabled device, in accordance with aspects of the subject disclosure. System 500 can comprise TPC 510 that can receive test input information. Additionally, TPC 510 can be connected to an authentication component to facilitate determining a permission to use received test input information. TPC 110 can be communicatively coupled to APICC 540, which can facilitate generation of TEI used to test DUTs, e.g., first TEI 511, etc., which can be employed in testing first DUT component 530, etc. TEI can be based on test input information received by TPC 510. APICC 540 can facilitate generation of groups of event images, e.g., one or more pods, supported by a containerization instance. Pods can comprise one or more event images. An event image can be an instance of a container that can encapsulate an application, workload, service, etc., with all needed dependencies, including system libraries, binaries, configuration files, consumable data, etc. As such, a pod can be deployed that can comprise a mix of nearly any number of, and any combination of, event images. As illustrated in example system 300, first pod 351 can comprise an emulation of one or more SSL agents, an emulation of one or more video streaming events, an emulation of one or more web search events, etc.

The disclosed subject matter can encounter DUTs that allow access to result data via a DUT API. As an example, first DUT 530 can comprise first DUT API 5302 that can enable report component 564 to access result data, often as NRT result data. It can be valuable to have access to the DUT via a DUT API, especially in NRT. As an example, permitting truncation of benchmark testing where NRT results indicate further testing according to a current testing scheme is unwarranted. In this example, first TEI 511 can cause first DUT component 530 to become seriously overburdened and this can be monitored in NRT via first DUT API 5302, for example. Accordingly, in this example, the benchmarking test can be terminated early, for example comparatively much earlier than waiting of the test to complete and first result data 531 to be accessible by report component 564. As another example, rather than terminating the test of first DUT component 530, access to performance via first DUT API 5302, such as via APICC 540, can enable APICC 540 to modify the pod(s) being employed and first TEI 511 can then be adapted in NRT to change the testing of first DUT component 530.

Report component 564 can receive first result data 531, and/or metrics of the test via first DUT API 5302, and can compile a report(s) for consumption, e.g., for presentation to a test engineer, for ingestion into an test result analysis engine, for modification of pod(s) and/or event image(s), etc. A report generated by report component 564, or pass-through of result data, e.g., first result data 531, etc., can be communicated back to TPC 510, APICC 540, etc., to facilitate subsequent testing, adaptation of ongoing testing, presentation of results, etc. In embodiments, a report generated by report component 564, and/or passed-through result data, can be rendered via a display component 568, e.g., a report can be displayed on a monitor for review by a test engineer, etc. In embodiments where report component 5645 can have access to first DUT API 5302, NRT results can be rendered via display component 568. In some embodiments, result data may not be communicated back to TPC 510 via report component 564, such as where testing result data is passed to test result analysis engines, etc. In some embodiments, first result data 531 can be provided in response to a query by report component 564, TPC 510, etc. In some circumstances, a human entity may need to request first result data 531 for delivery by email, CD-ROM, etc., where a DUT vendor choses not to allow report component 564 to poll for result data and also denies access to any DUT API, though these situations are likely to be rare.

Figure 6:
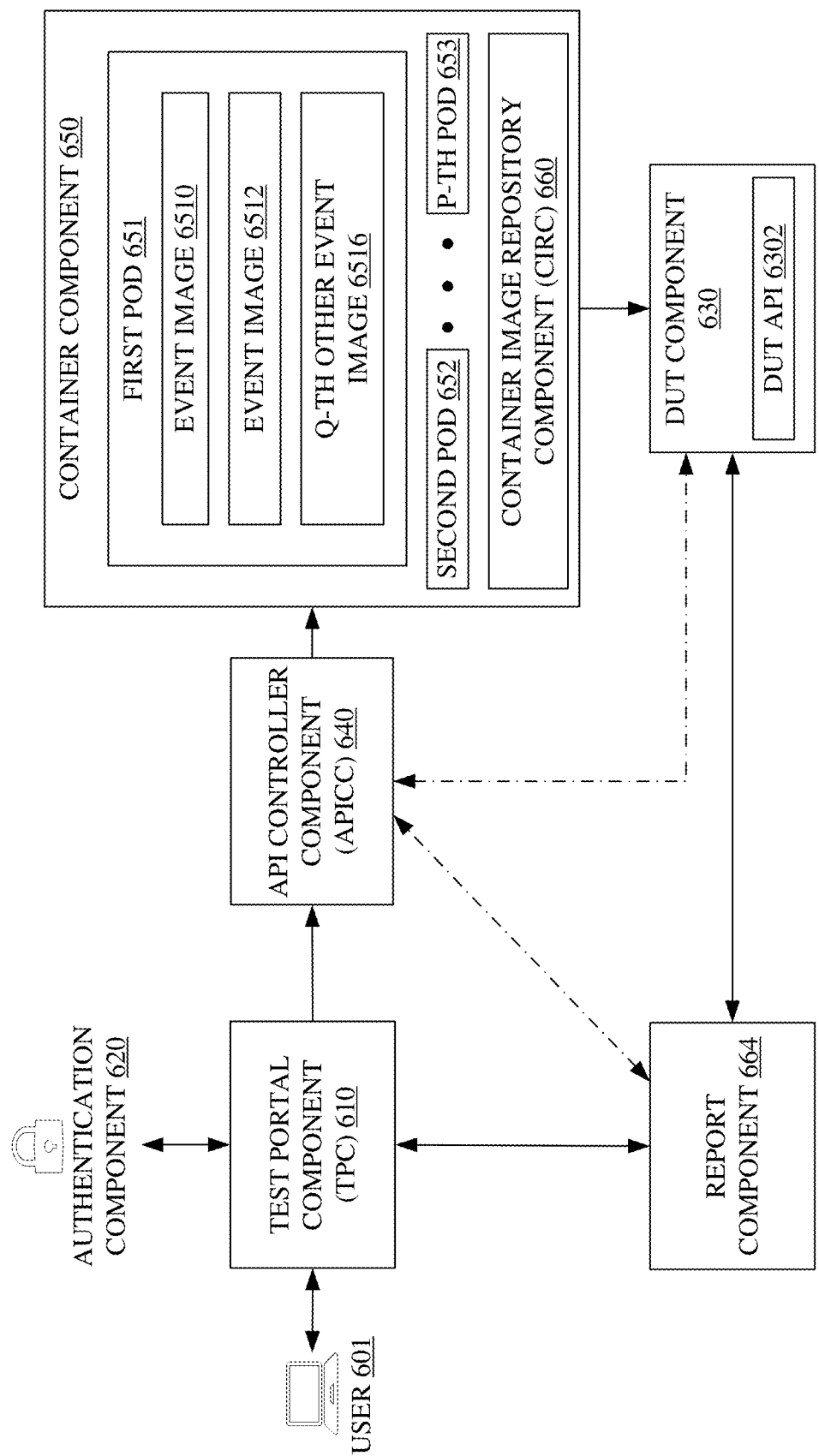
FIG. 6 is an illustration of an example system enabling self-service benchmarking of one or more SSL VPN enabled devices, in accordance with aspects of the subject disclosure.

FIG. 6 is an illustration of a system 600, which can support self-service benchmarking of one or more SSL VPN enabled devices, in accordance with aspects of the subject disclosure. System 600 can comprise TPC 610 that can receive test input information. TPC 610 can be connected to authentication component 620, etc., to facilitate determining a permission to use received of test input information, e.g., from user 601, etc., such as a test engineer, etc., which can be authenticated to TPC 610 via authentication component 620 prior to allowing use of any received test input information.

TPC 110 can be communicatively coupled to APICC 640, etc., that can facilitate generation of TEI used to test DUTs, e.g., DUT component 630, etc. TEI can be based on test input information received by TPC 610. APICC 640 can facilitate generation of groups of event images, e.g., first pod 651, second pod 652, . . . , P-th pod 653, etc., supported by container component 650. Pods, e.g., first pod 651, etc., can comprise one or more event images, e.g., event image 6510, event image 6512, Q-th event image 6516, etc. An event image can be an instance of a container that can encapsulate an application, workload, service, etc., typically with all needed dependencies, including system libraries, binaries, configuration files, consumable data, etc. As such, a pod can be deployed that can comprise a mix of nearly any number of, and any combination of, event images. In embodiments, event images can comprise viruses, worms, denial of service attacks, or other malware.

Some pods can be direct replicas of other pods, can be permutations of another pod, or can be pods comprising other groups of event images. In this regard, containerization instances can employ pod replication functionality to multiply demands to be placed on one or more DUTs, typically at less cost and higher speed than conventional test platforms. Moreover, containerization can be cloud based and/or premise based, e.g., can be a virtual containerization component, a physical containerization component, or any combination thereof, which can facilitate scalable deployment of DUT benchmark testing that can be performed from nearly any location.

Container component 650 can access one or more event images stored via CIRC 660. CIRCs can be comprised in container component 650, e.g., local to container component 650, and/or can be located external to container component 650, e.g., remote from container component 650. In an embodiment, CIRC 660 can act as a library of stored event images, for example, previously developed event images, event images that have been used historically to test a type of DUT, etc. In some embodiments, CIRC 660 can enable access to event images not stored by CIRC 660, for example in event image libraries external to CIRC 660. In an embodiment, CIRC 660 can also generate, modify, adapt, mutate, etc., event images. As an example, CIRC 660 can mutate a first event image to generate a second event image based on, but different from, the first event image. Accordingly, for example, container component 650 can generate pods that can comprise one or more pods that comprise one or more groups of one or more event images, wherein the event images can be previously used, newly generated, purchased from outside developers, etc., via CIRC 660. In this example, the pod(s) can then be employed in benchmark testing of one or more DUTs via APICC 640, e.g., TEI can comprise a pod(s) to test DUT component 630, etc.

Testing of a DUT(s) can generate result data that can be made accessible by report component 664. Result data can be accessed by TPC 610, e.g., via report component 664, etc., to facilitate subsequent testing, adaptation of ongoing testing, presentation of results, etc. As an example, based on near-real-time (NRT) result data, TPC 610, via APICC 640, can indicate that the TEI be modified, which can result, for example, in an additional pod being created by container component 650 from event images accessed via CIRC 660, wherein the TEI can be modified by APICC 640 to then cause further testing of DUT component 630 based on the newly added pod, causing new NRT result data to be accessible to TPC 610 that reflects the example modification. In some embodiments, result data may not be communicated back to TPC 610, in which embodiments, result data can be accessed in nearly any other manner, for example result data from one or more DUTs can be communicated to a result repository that can, for example, be accessed by an interested test engineer, etc.

As an extended example, user 601 can indicate a benchmark test comprising 100 tunnels with the mixture of patterns of a simulated user surfing the web, e.g., via one or more event images of one or more pod(s). The traffic mixture can be composed of web search, social-media traffic, and movie streaming for example. Where a virus/malware payload is employed, the corresponding event image can provide benign active virus signature traffic, for example, a virus/malware signature(s) obtained from reputable threat research repository site, etc. User 601 can engage TPC 610 and log in, being authenticated via authentication component 620, etc. After access has been established and authorization has been granted, and test input information affiliated with user 601 can be permitted to be used for deploying a benchmark test via APICC 640. In this example, user 601 can set the number of tunnels to be used in the test to 100 tunnels, e.g., via a UX, etc. Similarly, user 601 can also select a VPN configuration, e.g., to match a DUT to be tested, e.g., DUT component 630, etc., such as setting an endpoint IP, e.g., a DUT IP address, etc., username, password, etc., to be included in a VPN setup, for example, that can be employed by an SSL VPN agent event image of a pod comprised in container component 650, etc. User 601 can similarly check to see if the DUT is set up to allow multiple sessions from a same VPN user, or other parameters associated with the target DUT. Selection of available event images can be performed via the example UX by user 601, e.g., via TPC 610, APICC 640, and container component 650. This can enable user 601 to select different test traffic patterns to be included in a TEI used to test DUT component 630, etc. Configuration of a pod based on the test input information from user 601 can then be validated, for example via PVC 462, etc., and, where validated, APICC 640 can attempt to initiate a test connection, e.g., establishing one or more of the example selected 100 tunnels to DUT component 630. Validation can process pod information, such as, that an IP address for DUT component 630 is reachable from APICC 640, that TCP/443 is open and reachable, that a Username/Password are configured and working, etc. Validation errors can be presented to, and logged by, TPC 610, e.g., via APICC 640, etc.

Status of the tunnel(s) being built can be presented, for example, as each tunnel is created, etc. TPC 610 can generate a configuration that can include metadata or YAML configuration, where YAML is one example data serialization language that can be used for writing configuration files, etc. Configurations will be wrapped and encrypted, then sent to the APICC 640. APICC 640 can translate the configuration into an appropriate format for an employed containerization environment, e.g., KUBERNETES, AZURE KUBERNETES SERVICE, RED HAT OPENSHIFT, etc. Container component 650 can use the translated configurations to deploy one or more pod(s) comprising one or more event images. In embodiments, building-out event image, e.g., instances of a container(s), can employ a container registry repository service(s). Accordingly, container component 650 can have connectivity with appropriate access and authorization to perform a task(s) corresponding to the build-out of a pod comprising an event image. This permits container component 650 to gather appropriate event images into one or more pod(s), wherein the event images, e.g., applications, etc., can be queued and prepared for automated creation of a container inside a pod. Container replication functionality can be employed to replicate a pod into a plurality of pods that can contain the same event images, can contain permutations of the same event images, can contain some of the same event images with or without additional event images, etc.

APICC 640 can attempt to establish one or more tunnels based on the one or more event images of the one or more pods to be used in benchmark testing of DUT component 630, etc., e.g., an SSL agent event image of a pod can be employed to attempt establishing a tunnel to DUT component 630 and an automated script comprised in other event image(s) of the pod(s) can send traffic payload(s), for example, enabling contemporaneous or simultaneous communication of social media traffic patterns, web search traffic patterns, video stream traffic patterns, etc., via the tunnel. Accordingly, DUT component 630 can be stressed and performance can be tested, e.g., the test can attempt to establish 100 tunnels to DUT component 630, each with selected traffic patterns, to gauge the performance of DUT component 630, etc.

Performance of DUT 630 during the benchmark testing can be embodied in result data. Result data can be NRT, can be compiled and made available outside of NRT, etc. As an example, during testing a progress status explaining the behavior of the test can be accessible in NRT. As another example, result data can be accessible after conclusion of the benchmark testing. Accordingly, in this example, myriad key observation factors relating to performance of the benchmark testing and DUT component 630 can be presented to the user via report component 664, etc., which can comprise, for example, a number of tunnel attempts, a count of tunnels completed, payload bandwidth, total bandwidth or cumulative bandwidth, concurrent session(s) bandwidth that, for example, can be calculated by the cumulative bandwidth divided by the number of successful tunnels, tunnel latency average, for example, can be calculated using RFC4656 ONE-WAY NETWORK LATENCY TESTING (OWAMP), using a ping, etc., a number of threats allowed, a number of threats denied, type(s) of threat(s) encountered, or nearly any other performance metric(s) germane to the benchmark testing.

In embodiments, the performance testing process can be run via TPC 610, e.g., via APICC 640, container component 650, etc., whereby user 601 can separately log into DUT component 630 to observe performance metrics while the DUT is under test. This can result in user 601 frequently switching back and forth between DUT component 630 and TPC 610 as a benchmarking test proceeds. However, many modern DUTs can be API enabled and accessible machine-to-machine, e.g., via DUT PI 6302, etc. User 601 can indicate that DUT API 6302 is to be accessed as part of the benchmark testing, whereby APICC 640 can have visibility into the DUT as part of the testing. This visibility into DUT component 630, etc., can providing improved reporting capability over user 601 separately logging into the DUT, e.g., NRT/RT observation of DUT component 630, etc., under test. In this regard APICC 640 can communicate with DUT API 6302 to command, control, monitor, etc., DUT component 630, and can enable NRT/RT performance metric retrieval, e.g., to report component 664, etc.

Event images can include traffic patterns, application behaviors, etc. For example, traffic pattern type(s) for OFFICE 365, cloud services, gaming, social media, peer-to-peer traffic, video streaming, conference calls, malware, etc. Example application behaviors can be similarly emulated for applications such as WORD, EXCEL, VISIO, OUTLOOK, SALESFORCE, GOOGLE DOCS, ZOHO, STREAM, MINECRAFT, ROBLOX, FACEBOOK, INSTAGRAM, TIKTOK, BITTORRENT, NAPSTER, NETFLIX, HBO MAX, AMAZON VIDEO, WEBEX, ZOOM, MS TEAMS, etc. Ala carte selection of event images can be an advantage of the disclosed subject matter. For example, a pod can contain OUTLOOK traffic, SALESFORCE traffic, NETFLIX traffic, and NAPSTER traffic. This pod can be replicated in container component 650 and a first replicated pod can then be mutated to further include virus behavior, for example, while a second replicated pod can be mutated to substitute FACEBOOK traffic in lieu of the NAPSTER traffic. Generally, replication, mutation, etc., of pods can be readily automated. Accordingly, user 601 can have great flexibility to define granular traffic for testing of DUT component 630.

Figure 7:
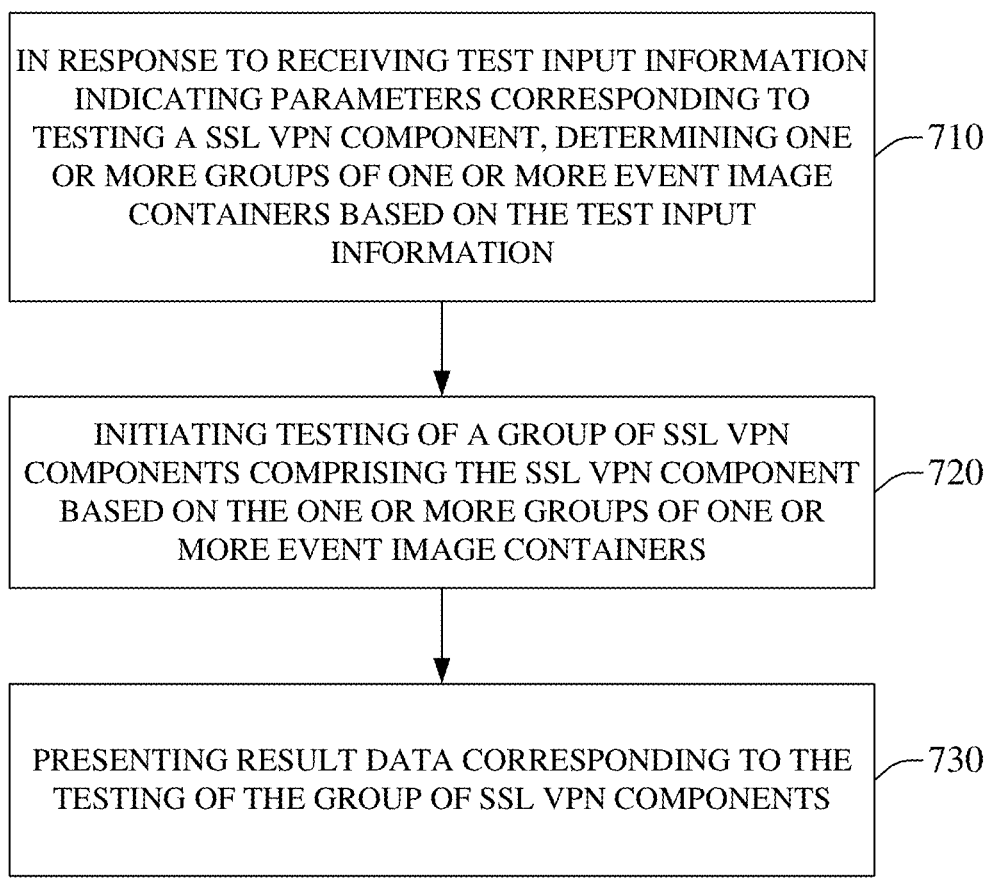
FIG. 7 illustrates an example method, facilitating testing of a SSL VPN enabled device employing scalable containerized test events, in accordance with aspects of the subject disclosure.
Figure 8:
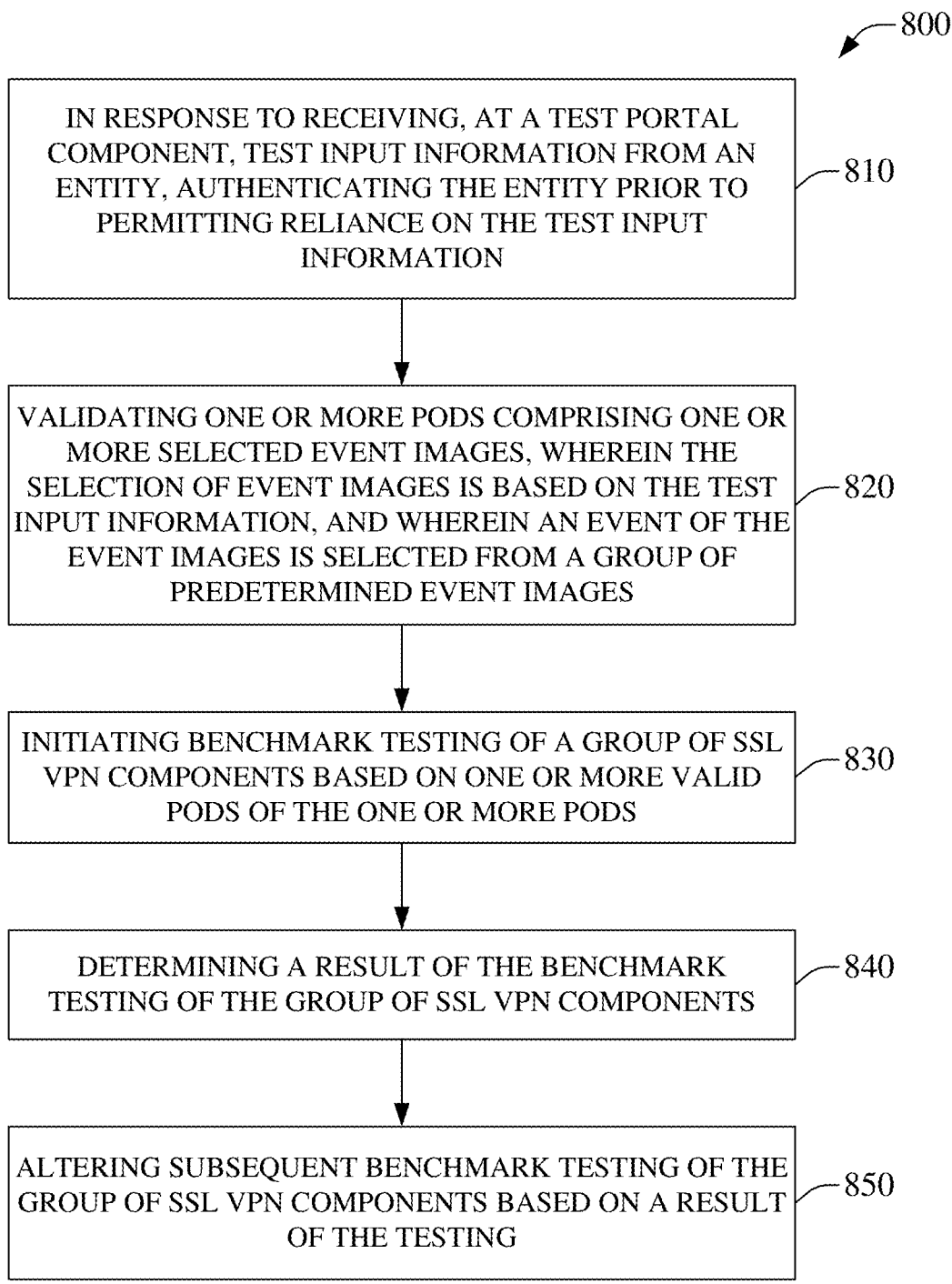
FIG. 8 illustrates an example method, enabling development of containerized events comprising selectable test event images supporting benchmarking of a SSL VPN enabled device, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates example method 700 that facilitates testing of a SSL VPN enabled device employing scalable containerized test events, in accordance with aspects of the subject disclosure. Method 700, at 710, can comprise receiving test input information. Test input information can indicate parameters for a test of a SSL VPN component, e.g., a DUT. In response to receiving the test input information, one or more groups of one or more event images, e.g., container(s), can be determined based on the test input information and/or the parameters embodied in the test input information, e.g., one or more pods can be determined wherein each pod can comprise one or more event images as disclosed elsewhere herein. Succinctly, the pod(s) and/or event(s) can be determined based on the test input information. In embodiments, a first pod of the pod(s) can be replicated to generate other pod(s). In some embodiments the other pod(s) can be a strict copy of the first pod. Thereafter, one or more of the other pod(s) can be mutated to cause a portion of the other pod(s) to be different from the first pod and/or one or more of the other pods. In some embodiment's, the replication of the first pod can result in other pod(s) that can be permutations of the first pod, e.g., replication can be inclusive of alteration, mutation, adaptation, etc., in some embodiments. Accordingly, pod replication and/or mutation applied to a first pod can result in one or more other pods that can be the same, similar, or distinct from the first pod and/or some of the other pods. As an example, a first pod can include a first event image that can emulate an SSL agent and a second event image that can emulate transmitting just one IP packet. In this example, the first pod can be replicated to generate a second identical pod. Moreover, in this example, the first pod can be replicated and mutated to generate a third pod that comprises the first event image of the SSL agent and a much more burdensome third event image emulating a user heavily interacting with a website, wherein the third event image can be substituted for the second event image, e.g., the third pod can be expected to more extensively burden a DUT in comparison to the first pod in this example. Further in this example, the third pod can be replicated to generate a fourth pod comprising the SSL agent event image, the third event image and an additional fourth, fifth, and sixth event image that can emulate other workloads, applications, etc., wherein the fourth pod can be expected to be even more of burden on a DUT than the third pod. This example demonstrates that replication and/or mutation of a container(s), e.g., an event image, a group of event images, etc., can provide an avenue to generating sufficiently large test events for one or more DUTs. Replication of a container is generally supported in many modern containerization environments.

At 720, method 700 can comprise initiating testing of a group of SSL VPN components, e.g., DUTs, comprising the SSL VPN component, e.g., a DUT, based on the one or more groups, e.g., pod(s), of one or more event image(s). Test event information can be sent to a DUT(s) based on one or more event images of one or more pod. As an example, a pod can comprise several event images that can be communicated to a DUT to cause the DUT to attempt to correspondingly perform operations. In this regard, an SSL agent event image can initiate a tunnel with a DUT, and similarly, several SSL agent event images can initiate several tunnels to the DUT. This can enable initiate one or more SSL VPN tunnels to a DUT(s), whereby other event image(s) can initiate corresponding operations via the tunnel(s) to the DUT(s). The performance of the DUT(s) can by monitored accordingly to characterize the performance of the DUT(s). In comparison to conventional pilot-testing, which typically only attempts to establish a few tunnels that have been generally manually configured, the disclosed subject matter can rapidly and affordably attempt nearly any number of tunnels to one or more types of DUT, and can further apply numerous variations of loads to the DUT(s) based on event images that can be readily provisioned, replicated, mutated, etc.

Method 700, at 730, can comprise presenting result data corresponding to the testing of the group of SSL VPN components. At this point, method 700 can end. In response to TEI(s) being generated based on one or more pod(s) each comprising one or more event image(s), one or more DUT(s) can be pressed into service. The performance of the DUT(s) can be characterized, measured, monitored, etc., so as to generate result data that can be presented to an entity, e.g., a user, user agent, results analysis system, etc. As an example, a pod can tunnel to a DUT in accord with event image(s) of the pod to burden the DUT. The example burdened DUT can be monitored such that performance metrics can be recorded, which can then be communicated to a test engineer, for example, in the form of an after-test report, in the form of near-real-time (NRT) or real-time (RT) data presented via a user interface (UX), in the form of values passed to a benchmark testing results analysis engine, etc. As such, the disclosed subject matter can avoid one-off type test systems, can be an improvement over pilot-testing, can be deployed from nearly any containerization component deployment, etc.

FIG. 8 illustrates example method 800 facilitating development of containerized events comprising selectable test event images supporting benchmarking of a SSL VPN enabled device, in accordance with aspects of the subject disclosure. At 810, method 800 can comprise receiving test input information from an entity at a TPC, e.g., receiving test input information from a test engineer at a TPC, from an automated benchmark test design system at the TPC, etc. Test input information can indicate parameters for a test of a SSL VPN component, e.g., a DUT. In response to receiving the test input information, the entity can be authenticated. In an example, a web-based UX can enable a test engineer to enter test input information. Accordingly, in this example, it can be desirable to authenticate the test engineer to avoid non-authorized users from entering test input information. In this example, the test engineer can login to the TPC via the web-based UX to facilitate authenticating, verifying, etc., the test engineer as a valid user prior to permitting any test input information from the test engineer to be used. In a variation of this example, a test engineer can be affiliated with limited permissions, e.g., permission to test a portion of DUTs accessible via a TPC, etc., and, as such, authentication of the test engineer can correspond to permitting the received test input information to be employed in testing of the example portion of the accessible DUTs.

In embodiments, one or more groups, e.g., pod(s), of one or more event images, e.g., container(s), can be determined based on the test input information and/or test parameters embodied in the test input information, e.g., one or more pods can be determined wherein each pod can comprise one or more event images. In embodiments, a first pod of the pod(s) can be replicated to generate other pod(s). In some embodiments the other pod(s) can be a strict copy of the first pod. Thereafter, one or more of the other pod(s) can be mutated to cause a portion of the other pod(s) to be different from the first pod and/or one or more of the other pods. In some embodiment's, the replication of the first pod can result in other pod(s) that can be permutations of the first pod, e.g., replication can be inclusive of alteration, mutation, adaptation, etc. Accordingly, pod replication and/or mutation applied to a first pod can result in one or more other pods that can be the same, similar, or distinct from the first pod and/or some of the other pods. Replication of a container is generally supported in many modern containerization environments.

Method 800, at 820, can comprise validating one or more pods, each comprising one or more selected event images. Selection of event images, as disclosed elsewhere herein, can be based on the test input information. Moreover, an event of the event images can be selected from a group of predetermined event images, for example, via CIRC 360, 460, 660, etc. These predetermined event images, in embodiments, can be further mutated, replicated, etc. In this regard, a pod can comprise event image(s) from a library(ies) of previously used event image(s), from commercial vendors of event images, from other public or private data sources, etc., for example, a virus-type event image can be based on publicly available virus signature, traffic patterns, etc. In embodiments, a pod(s) can be validated as being germane to the testing in view of the received test input information. Moreover, the pod(s) can be validated as being functional, e.g., not comprising defective, conflicting, etc., event image(s), such as be running the pod against an emulation of a well understood DUT, or nearly any other manner of validating the functionality of the pod(s) prior to performing benchmark testing of a target DUT(s).

At 830, method 800 can comprise initiating testing of a group of SSL VPN components, e.g., DUTs, comprising the SSL VPN component, e.g., a DUT, based on one or more valid pod(s), each comprising one or more event image(s). Test event information (TEI) can be sent to a DUT(s) based on one or more event images of one or more validated pod. As an example, a valid pod can comprise several functional event images that can be communicated, via an initiated tunnel, to a DUT to cause the DUT to attempt to correspondingly perform operations. This can enable initiate one or more SSL VPN tunnel(s) to a DUT(s), whereby other event image(s) can initiate corresponding operations via the tunnel(s) to the DUT(s). The performance of the DUT(s) can by monitored accordingly to characterize the performance of the DUT(s).

Method 800, at 840, can comprise determining a result of the benchmark testing of the group of SSL VPN component(s). In response to TEI(s) being generated based on one or more valid pod(s) each comprising one or more event image(s), one or more DUT(s) can be pressed into service. The performance of the DUT(s) can be characterized, measured, monitored, etc., so as to generate result data that can be presented to an entity, e.g., a user, user agent, results analysis system, etc. Result data corresponding to the testing of the group of SSL VPN component(s) can be accessed, for example via a TPC. As an example, a pod can tunnel to a DUT in accord with event image(s) of the pod to burden the DUT. The example burdened DUT can be monitored such that performance metrics can be recorded, which can then be communicated to a test engineer, for example, in the form of an after-test report, in the form of near-real-time (NRT) or real-time (RT) data presented via a user interface (UX), in the form of values passed to a benchmark testing results analysis engine, etc.

Method 800, at 850, can comprise altering subsequent benchmark testing of the group of SSL VPN component(s) based on a result of the testing. At this point, method 800 can end. Whereas, at 840, results can be determined, these results can then affect subsequent testing of a DUT(s). In an embodiment, results from a completed first benchmark test of a DUT can be used to generate new test input data for a subsequent benchmark test, for example, where the DUT performed adequately with 10 tunnels and a group of event images, this adequate performance can be the premise of a more stressful subsequent test, for example with 200 tunnels, with variants of the event images, etc. In another embodiment, where results can be determined in NRT, or even RT, the results can be used to alter subsequent testing by altering s future test design, by altering a test in progress, etc. As an example, a DUT can be under test and a NRT result can indicate that the DUT is not performing as expected. This NRT result, for example, can be received by a TPC that can then indicate, e.g., via an APICC, etc., modification of the test being run, for example, altering a parameter of one or more event image(s) of the pod being used to test the example DUT. Accordingly, in this example, the test can be adapted on the fly based on NRT results being monitored. In another example, a DUT can be under a first phase of a test and a NRT result can indicate that the DUT is not performing as expected. In this example, the test can have a first phase and a plurality of possible second phases. Accordingly, in this example, TPC can trigger operations based on the NRT result, such as selecting a second phase of the possible second phases of the test, e.g., steering test branching, etc. In some embodiments, a result from testing a first DUT can be employed in modification of subsequent benchmark testing of other DUTs, e.g., the result from testing the first DUT can result in modifying an event image(s) and/or pod(s) applied to a second DUT. This modification of subsequent testing of other DUTs can also be applied to other DUT testing that is undergoing contemporaneous or simultaneous testing, or to subsequent tests of the other DUT(s) that can occur in the future. As an example, a NRT result of a first DUT test that has not yet completed can be employed to adapt testing of a second DUT that has also not yet completed testing. As a further example, a NRT result of a first DUT test that has not yet completed can be employed to adapt testing of a second DUT that has not yet begun a subsequent test. As yet a further example, a result of a first DUT test that has completed can be employed to adapt testing of a second DUT that has not yet completed testing. Numerous other examples can be readily presented, as will be appreciated by one of skill in the art, and all such examples are to be considered within the scope of the instant disclosure even where not explicitly recited for the sake of clarity and brevity.

Figure 9:
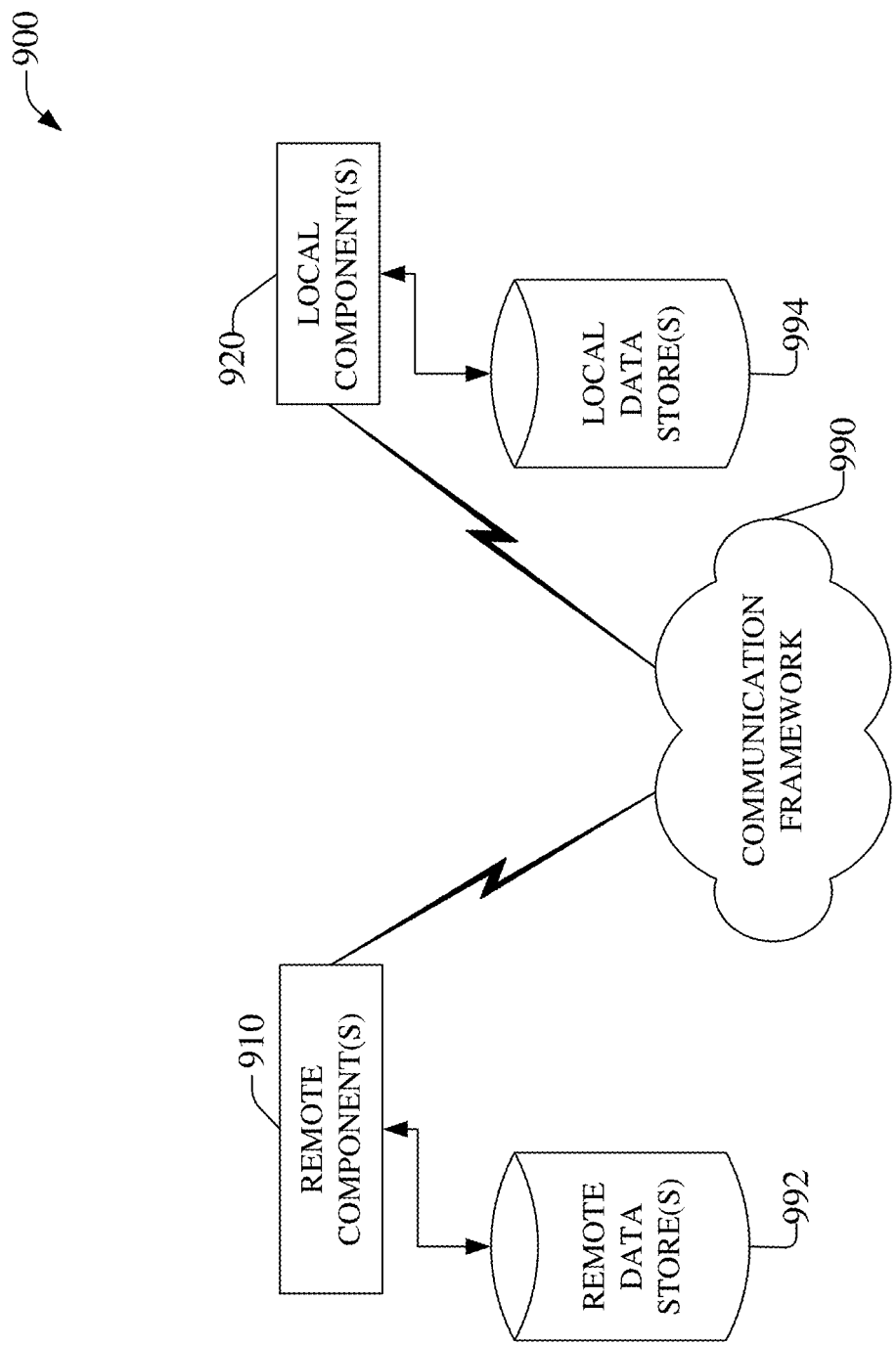
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise TPC 110-610, etc., authentication component 120-220, 620, etc., APICC 240-640, etc., container component 250-450, 650, etc., CIRC 360-460, 660, etc., PVC 462, etc., report component 564, 664, etc., display component 568, etc., or any other component that is located remotely from another component of systems 100-600, etc.

The system 900 also comprises one or more local component(s) 920. The local component(s) 920 can be hardware and/or software (e.g., threads, processes, computing devices). In some embodiments, local component(s) 920 can comprise TPC 110-610, etc., authentication component 120-220, 620, etc., APICC 240-640, etc., container component 250-450, 650, etc., CIRC 360-460, 660, etc., PVC 462, etc., report component 564, 664, etc., display component 568, etc., or any other component that is located local to another component of systems 100-600, etc. As one of many possible examples, a TPC and an APICC can be at a first location and can communicate with a container component located at a second location to deploy testing of DUTs at several other remote locations.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, 5G, 6G, and/or another path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, test input information, TEI, result data, NRT result data, RT result data, etc., can be communicated between components of systems 100-600 via a communication framework, e.g., communication framework 990, etc.

Figure 10:
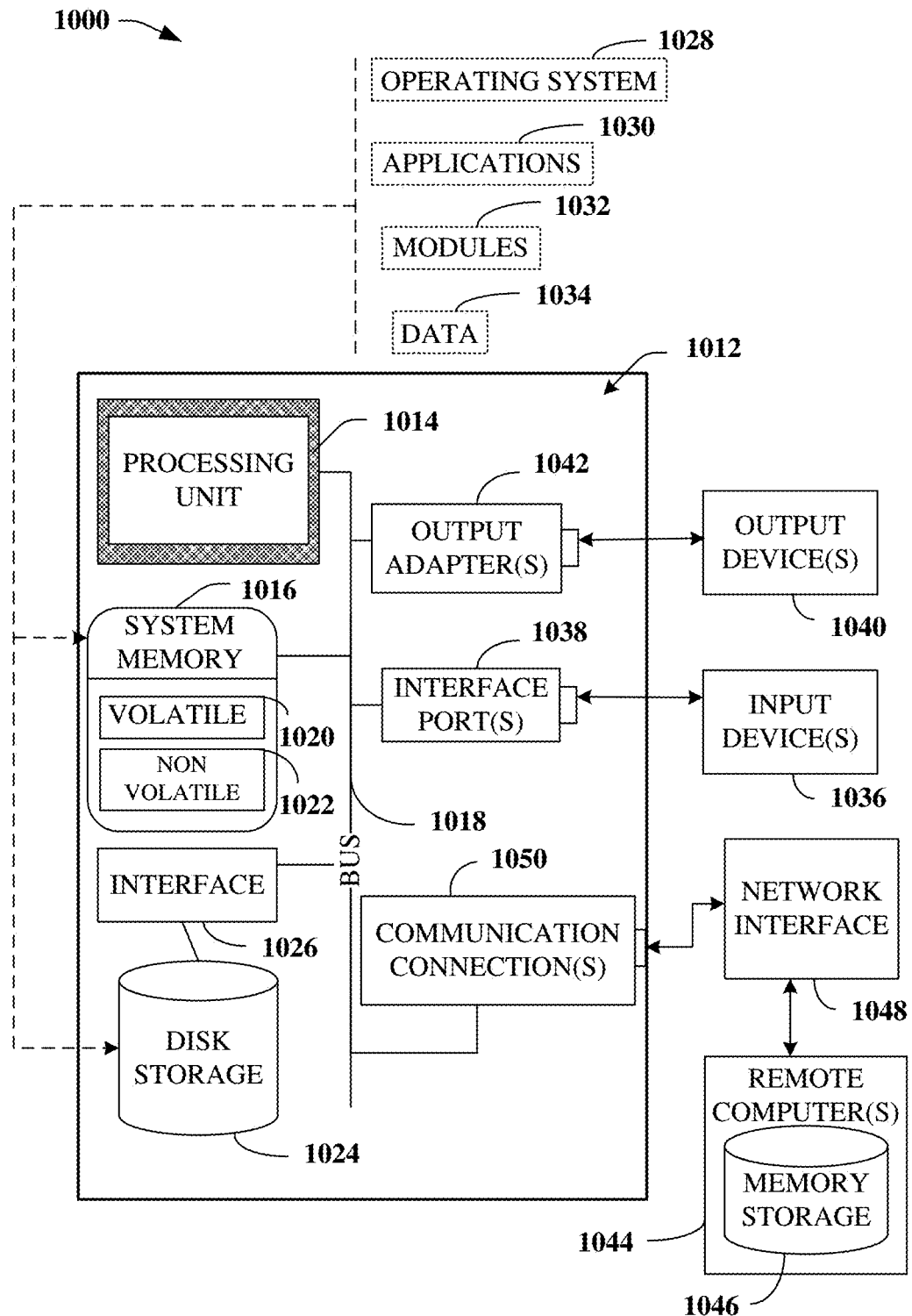
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in TPC 110-610, etc., authentication component 120-220, 620, etc., APICC 240-640, etc., container component 250-450, 650, etc., CIRC 360-460, 660, etc., PVC 462, etc., report component 564, 664, etc., display component 568, etc., or, or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising, receiving test input information from an authenticated entity, wherein the test input information corresponds to preparation of a benchmark test for testing a device-under-test configured to demand communication via a secure sockets layer virtual private network, initiating provisioning a pod via a containerization environment instance, wherein the pod comprises an event image selected from a library of event images based on the test input information, wherein the pod is validated prior to determining test event information that is to be used to test a device-under-test, wherein the pod can undergo a container operation selected from a group of container operations comprising a pod replication operation, a pod mutation operation, and a provision new pod operation, and receiving a result of a benchmark test in response to testing the device-under-test in according with the test event information.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), fifth generation partnership project (5G or 5GPP); sixth generation partnership project (6G or 6GPP), next generation (NG) radio, LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, the operations comprising:
   determining, based on test input information, a test parameter applicable for use in a benchmark testing of a device-under-test configured to facilitate communication via a secure sockets layer virtual private network;
   determining, based on the test input information, a pod, wherein the pod comprises an event image, and wherein the pod undergoes a container operation in an isolated containerization environment instance for the benchmark testing, wherein the event image comprises an agent for communicating over a secure sockets layer virtual private network link, wherein the event image encapsulates an application including system libraries, binaries and configuration files for performing the benchmark test;
   initiating a benchmark test of the device-under-test according to test event information corresponding to the event image comprised in the pod for benchmarking a performance of the device-under-test; and
   enabling an access to a result of the benchmark test of the device-under-test.

2. The device of claim 1, wherein the container operation comprises at least one of: a pod replication operation, a pod mutation operation, or a new pod operation.

3. The device of claim 1, wherein the event image is selected from a group of event images determined prior to receiving the test input information.

4. The device of claim 1, wherein the event image is selected from a group of previously used event images.

5. The device of claim 1, wherein the event image is selected from a group of event images generated by a vendor device associated with a vendor entity.

6. The device of claim 1, wherein the event image is selected from a group of event images comprising an event image that has not been previously used for testing.

7. The device of claim 1, wherein the enabling the access to the result is via a report comprising a value based on the result.

8. The device of claim 1, wherein the enabling the access to the result is via a display device.

9. The device of claim 1, wherein the result is accessed during execution of the benchmark test.

10. The device of claim 1, wherein the result is accessed by an automated result analysis engine.

11. The device of claim 1, wherein the operations further comprise authenticating an entity correlated to the test input information prior to permitting the test input information to be used.

12. The device of claim 1, wherein the operations further comprise adapting subsequent benchmark testing occurring after the initiating of the benchmark test and that is based on the test input information and the result of the benchmark test of the device-under-test.

13. The device of claim 12, wherein the benchmark test is a first benchmark test, wherein the result is accessed during execution of the benchmark test, and wherein the adapting the subsequent benchmark testing comprises adapting the first benchmark test prior to concluding the first benchmark test.

14. The device of claim 12, wherein the benchmark test is a first benchmark test, and wherein the adapting the subsequent benchmark testing comprises adapting a second benchmark test occurring after the first benchmark test has concluded.

15. A method, comprising:
   receiving, by a processor of a system, test input information from an authenticated user, wherein the test input information corresponds to a preparation of a benchmark test for testing a device-under-test that is able to communicate via a secure sockets layer virtual private network;
   instructing, by the processor of the system, an isolated containerization environment instance for the benchmark test to provision a pod that comprises an event image, wherein the pod is validated, wherein a container operation is applied to the pod in the isolated containerization environment instance for the benchmark test, wherein the event image comprises an agent for communicating over a secure sockets layer virtual private network link, and wherein the event image encapsulates an application including system libraries, binaries and configuration files for performing the benchmark test;
   initiating, by the processor of the system, the benchmark test of the device-under-test according to test event information determined from the event image comprised in the pod for benchmarking a performance of the device-under-test; and
   receiving, by the processor of the system, a result of the benchmark test of the device-under-test.

16. The method of claim 15, wherein the instructing the isolated containerization environment instance comprises instructing the containerization environment instance to provision the pod with the event image selected from a library of event images based on the test input information.

17. The method of claim 15, wherein the instructing the isolated containerization environment instance comprises instructing the containerization environment instance to perform the container operation, the container operation comprises at least one of: a pod replication operation, a pod mutation operation, or a provision new pod operation.

18. The method of claim 15, wherein the benchmark test for the device-under-test is a first benchmark test, and further comprising adapting, by the system, a second benchmark test, subsequent to the initiating of the first benchmark test, based on the test input information and the result of the first benchmark test, wherein the result is one of a group of results comprising a result determined prior to completion of the first benchmark test, and a result determined after completion of the first benchmark test, wherein the second benchmark test is selected from a group of tests comprising a benchmark test to be executed after completion of the first benchmark test, a benchmark test to be executed before the completion of the first benchmark test, and a benchmark test, supporting test branching, to be executed after a first portion of the first benchmark test has completed.

19. A non-transitory machine-readable storage medium, comprising executable instructions that, when executed by a processor, facilitate performance of operations, the operations comprising:

receiving test input information from a device associated with an authenticated entity, wherein the test input information corresponds to a preparation of a benchmark test usable to test a device-under-test configured to request communication via a secure sockets layer virtual private network;

initiating provisioning a pod in an isolated containerization environment instance for the benchmark test, wherein the pod comprises an event image selected from a data store of event images based on the test input information for benchmarking a performance of the device-under-test, wherein the pod is validated prior to determining test event information that is to be used to test the device-under-test, and wherein the pod undergoes a container operation comprising at least one of: a pod replication operation, a pod mutation operation, or a provision new pod operation, wherein the event image comprises an agent for communicating over a secure sockets layer virtual private network link, and wherein the event image encapsulates an application including system libraries, binaries and configuration files for performing the benchmark test; and receiving a result of the benchmark test in response to benchmark testing the device-under-test in accordance with the test event information.

20. The non-transitory machine-readable storage medium of claim 19, wherein the device-under-test is a first device-under-test, wherein the benchmark test is a first benchmark test that comprises a first portion and a second portion, wherein the first benchmark test tests the first device-under-test, wherein a second benchmark test comprises a third portion and a fourth portion, wherein the second benchmark test tests a second device-under test, wherein the first portion and the third portion are applied contemporaneously, and wherein the fourth portion is modified based on the result corresponding to the testing of the first device-under-test using the first portion.

* * * * *